(12) United States Patent
Sazuka et al.

(10) Patent No.: US 11,157,078 B2
(45) Date of Patent: Oct. 26, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Naoya Sazuka, Tokyo (JP); Kiyoshi Yoshikawa, Saitama (JP); Masayuki Yokoyama, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/753,880

(22) PCT Filed: Aug. 17, 2018

(86) PCT No.: PCT/JP2018/030554
§ 371 (c)(1),
(2) Date: Apr. 6, 2020

(87) PCT Pub. No.: WO2019/073689
PCT Pub. Date: Apr. 18, 2019

(65) Prior Publication Data
US 2020/0285310 A1    Sep. 10, 2020

(30) Foreign Application Priority Data

Oct. 13, 2017    (JP) .............................. JP2017-199080

(51) Int. Cl.
*G06F 3/01*    (2006.01)
*G02B 27/00*    (2006.01)
*G02B 27/01*    (2006.01)

(52) U.S. Cl.
CPC .......... *G06F 3/013* (2013.01); *G02B 27/0093* (2013.01); *G02B 27/0172* (2013.01);
(Continued)

(58) Field of Classification Search
CPC ...... G02B 2027/0138; G02B 2027/014; G02B 2027/0178; G02B 2027/0187;
(Continued)

(56) References Cited

U.S. PATENT DOCUMENTS

2005/0068255 A1* 3/2005 Urakawa ............ G02B 27/0176
345/7
2006/0077558 A1* 4/2006 Urakawa ............ G02B 27/0093
359/630

(Continued)

FOREIGN PATENT DOCUMENTS

CN    104811681 A    7/2015
CN    105531716 A    4/2016
(Continued)

*Primary Examiner* — Dmitriy Bolotin
(74) *Attorney, Agent, or Firm* — Paratus Law Group, PLLC

(57) ABSTRACT

An information processing apparatus according to an embodiment of the present technology includes an acquisition unit and a movement unit. The acquisition unit acquires eye information regarding an eye of a user. The movement unit moves, on the basis of the acquired eye information, at least a part of an image display mechanism that emits and guides image light to the eye of the user. Thus, it is possible to realize high-quality viewing experience for, for example, a user using an HMD or the like. Thus, it is possible to realize high-quality viewing experience for, for example, a user using an HMD or the like.

20 Claims, 10 Drawing Sheets

(52) U.S. Cl.
CPC .... *G02B 27/0179* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC .............. G02B 27/0093; G02B 27/017; G02B 27/0172; G02B 27/0179; H04N 13/344; H04N 13/366; H04N 13/327; G06F 3/013
See application file for complete search history.

(56) References Cited

U.S. PATENT DOCUMENTS

| | | |
|---|---|---|
| 2013/0293468 A1 | 11/2013 | Perez et al. |
| 2014/0146075 A1* | 5/2014 | Takasu ................. G02B 27/017 345/619 |
| 2015/0035744 A1 | 2/2015 | Robbins et al. |
| 2015/0097772 A1* | 4/2015 | Starner ................... G06F 3/013 345/158 |
| 2020/0387240 A1* | 12/2020 | Munakata ............. G06F 3/0346 |
| 2021/0089776 A1* | 3/2021 | Aonuma ............... G02B 27/017 |

FOREIGN PATENT DOCUMENTS

| | | |
|---|---|---|
| JP | H07-049464 A | 2/1995 |
| JP | H07-154829 A | 6/1995 |
| JP | H07-255669 A | 10/1995 |
| JP | 2000-131643 A | 5/2000 |
| JP | 2001-189902 A | 7/2001 |
| JP | 2002-031776 A | 1/2002 |
| JP | 2004-304296 A | 10/2004 |
| JP | 2005-107179 A | 4/2005 |
| JP | 2005-227950 A | 8/2005 |
| JP | 2006-105889 A | 4/2006 |
| JP | 2012-194501 A | 10/2012 |
| JP | 2016-191845 A | 11/2016 |
| WO | WO 2016/113951 A1 | 7/2016 |

\* cited by examiner

A

B

C

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/030554 (filed on Aug. 17, 2018) under 35 U.S.C. § 371, which claims priority to Japanese Patent Application No. 2017-199080 (filed on Oct. 13, 2017), which are all hereby incorporated by reference in their entirety.

TECHNICAL FIELD

The present technology relates to an information processing apparatus, an information processing method, and a program applicable to image display apparatuses such as HMDs (Head Mount Displays).

BACKGROUND ART

Patent Literature 1 describes a technology to detect user's visual lines to control an image display. For example, user's eyes are shot by cameras installed in an HMD, and a user's visual line direction and an observation point on the HMD are calculated on the basis of shot images. A high-quality partial image is displayed about the observation point, and a low-quality image is displayed on the periphery of the partial image. Thus, it is possible to control an image display on the basis of a region capable of being recognized by a user with high accuracy (paragraphs [0051], [0052], [0060], and [0066], FIGS. 1 and 3, etc., of the specification of Patent Literature 1).

In Patent Literature 2, a plurality of image data items obtained by shooting a subject at a plurality of different positions is appropriately selected and combined together on the basis of a user's position and a focal position. Combined image data is displayed on a display as a presentation image. Thus, it is possible to display a blurred image (an image having prescribed depth of field) which is a natural (more realistic) image for a human being and in which the periphery of a notice point is blurred (paragraphs [0059], [0074], [0075], and [0098], FIGS. 10 to 13, etc., of the specification of Patent Literature 2).

CITATION LIST

Patent Literature

Patent Literature 1: Japanese Patent Application Laid-open No. 2016-191845
Patent Literature 2: Japanese Patent Application Laid-open No. 2005-227950

DISCLOSURE OF INVENTION

Technical Problem

In the future as well, it is expected that the experience of VR (Virtual Reality) or AR (Augmented Reality) using HMDs or the like will become pervasive, and technologies making it possible to realize high-quality viewing experience have been demanded.

In view of the above circumstances, it is an object of the present technology to provide an information processing apparatus, an information processing method, and a program making it possible to realize high-quality viewing experience for users.

Solution to Problem

In order to achieve the above object, an information processing apparatus according to an embodiment of the present technology includes an acquisition unit and a movement unit.

The acquisition unit acquires eye information regarding an eye of a user.

The movement unit moves, on the basis of the acquired eye information, at least a part of an image display mechanism that emits and guides image light to the eye of the user.

In the information processing apparatus, at least a part of the image display mechanism is moved on the basis of eye information regarding an eye of a user. Thus, it is possible to realize high-quality viewing experience for the user.

The image display mechanism may have a display that emits the image light and a lens system that guides the image light emitted from the display to the eye of the user. In this case, the movement unit may move at least one of the display or the lens system.

The eye information may include an eye image obtained by shooting the eye of the user.

The eye information may include at least one of a shape, a size, a position, an inclination, or an iris pattern of the eye of the user in the eye image.

The image display mechanism may be provided in an HMD (Head Mount Display) wearable by the user. In this case, the eye information may include the eye image obtained by shooting the eye of the user with an imaging mechanism of the HMD.

The information processing apparatus may further include a storage unit that stores reference eye information representing the eye information obtained when the eye of the user is put in a prescribed state with respect to the image display mechanism. In this case, the movement unit may move at least a part of the image display mechanism on the basis of the acquired eye information and the reference eye information.

The prescribed state may include a state in which a reference image displayed by the image display mechanism is arranged at a prescribed size and a prescribed position with respect to the eye of the user inside the eye image.

The reference eye information may include a reference eye image obtained by shooting the eye of the user when the eye of the user is put in the prescribed state with respect to the image display mechanism. In this case, the movement unit may move at least a part of the image display mechanism on the basis of a difference between the eye image and the reference eye image.

The movement unit may move at least a part of the image display mechanism such that a state of the eye of the user with respect to the image display mechanism comes close to the prescribed state.

The movement unit may move at least a part of the image display mechanism such that a state of the eye of the user with respect to the image display mechanism is put in another state different from the prescribed state.

The information processing apparatus may further include a display control unit that controls an image display by the image display mechanism. In this case, the display control unit may move, on the basis of the acquired eye information, a display position of an image displayed by the image display mechanism.

The movement unit may move at least a part of the image display mechanism on the basis of details of content displayed by the image display mechanism.

The movement unit may move at least a part of the image display mechanism on the basis of a viewing time of the user.

The information processing apparatus may further include a state acquisition unit that acquires state information regarding a state of the user. In this case, the movement unit may move at least a part of the image display mechanism on the basis of the acquired state information.

The information processing apparatus may further include a determination unit that determines reliability of a detection result by a biosensor on the basis of a movement amount by the movement unit with respect to at least a part of the image display mechanism.

The information processing apparatus may further include an attachment state control unit capable of controlling an attachment state of the HMD on the basis of the acquired eye information.

The information processing apparatus may further include a notification unit that notifies the user of prescribed information on the basis of the acquired eye information.

The eye information may include a left-eye image obtained by shooting a left eye of the user and a right-eye image obtained by shooting a right eye of the user. In this case, the movement unit may move at least a part of the image display mechanism on the basis of the left-eye image or the right-eye image.

An information processing method according to an embodiment of the present technology is an information processing method performed by a computer system and includes acquiring eye information regarding an eye of a user. On the basis of the acquired eye information, at least a part of an image display mechanism that emits and guides image light to the eye of the user is moved.

A program according to an embodiment of the present technology causes a computer system to perform the following steps.

The steps include: a step of acquiring eye information regarding an eye of a user; and a step of moving, on the basis of the acquired eye information, at least a part of an image display mechanism that emits and guides image light to the eye of the user.

Advantageous Effects of Invention

As described above, the present technology makes it possible to realize high-quality viewing experience for users. Note that the effect described here should not be interpreted in a limited way, and any effect described in the present specification may be produced.

MODE(S) FOR CARRYING OUT THE INVENTION

Hereinafter, embodiments according to the present technology will be described with reference to the drawings.

Configuration of Image Display Apparatus

Figure 1:
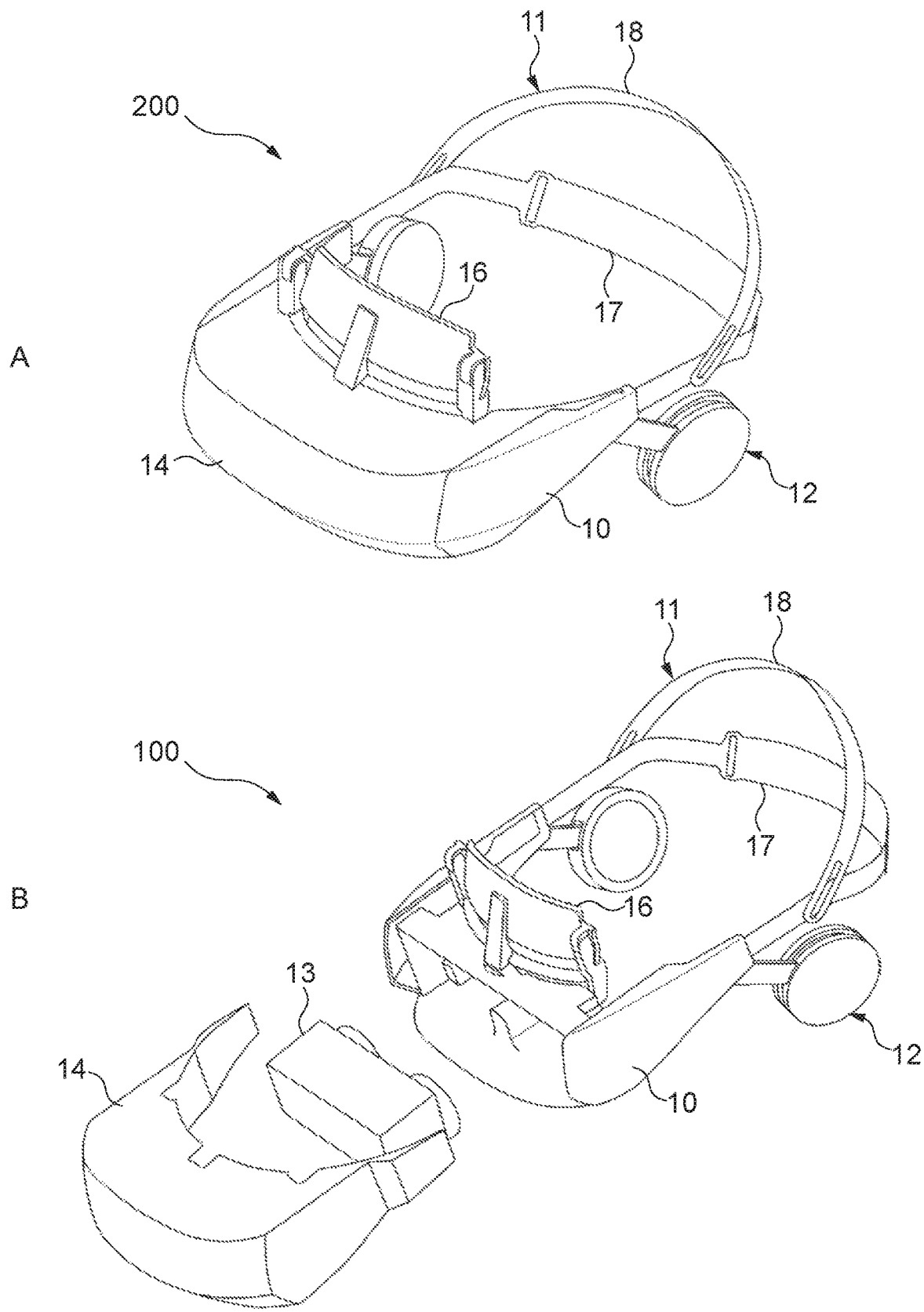
FIGS. 1A and 1B are views showing a configuration example of an HMD (Head Mount Display) that is an image display apparatus according to an embodiment of the present technology.
Figure 2:
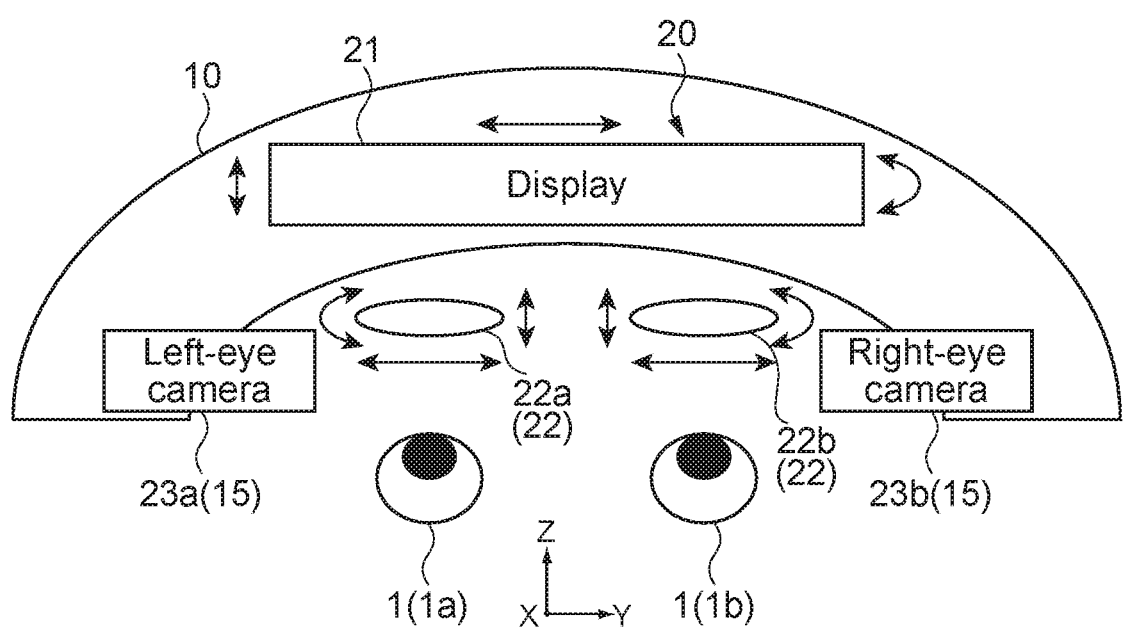
FIG. 2 is a schematic view for describing a configuration example of the inside of a display unit shown in FIG. 1B.

FIGS. 1A and 1B are views showing a configuration example of an HMD (Head Mount Display) that is an image display apparatus according to an embodiment of the present technology. FIG. 1A is a perspective view schematically showing the appearance of an HMD 100, and FIG. 1B is a perspective views schematically showing a state in which the HMD 100 is disassembled. FIG. 2 is a schematic view for describing a configuration example of the inside of a display unit 13 shown in FIG. 1B. Note that HMD 100 functions also as an information processing apparatus according to the present technology.

The HMD 100 has a base member unit 10, an attachment band unit 11, a headphone unit 12, the display unit 13, a cover unit 14, and an imaging mechanism 15.

The base member unit 10 is a member arranged in front of left and right eyes 1 (1*a* and 1*b*) of a user and provided with a front support unit 16 that is brought into contact with the front of the user.

The attachment band unit 11 is attached to the forehead of the user. As shown in FIGS. 1A and 1B, the attachment band unit 11 has a temporal band 17 and a parietal band 18. The temporal band 17 is connected to the base member unit 10 and attached so as to surround the head of the user from the temporal part to the back part of the head. The parietal band 18 is connected to the temporal band 17 and attached so as to surround the head of the user from the temporal part to the parietal part.

In the present embodiment, a band adjustment mechanism 25 (see FIG. 3) capable of automatically adjusting the retention force of each of the temporal band 17 and the parietal band 18 is provided. By the operation of the band adjustment mechanism 25, the length of the temporal band 17 protruding outward from the base member unit 10 is changed. As a result, the retention force for retaining the head is changed. Further, by the operation of the band adjustment mechanism 25, the length of the parietal band 18 is changed. As a result, the retention force for retaining the head is changed. Note that the angle of the parietal band 18 with respect to the temporal band 17 may be changed.

The configuration of the band adjustment mechanism 25 is not limited and includes, for example, an arbitrary actuator mechanism using a motor, a piezoelectric element, a wire, a hinge, a solenoid, a shape-memory alloy (SMA), or the like.

The headphone unit 12 is connected to the base member unit 10 and arranged so as to cover the left and right ears of the user. The headphone unit 12 is provided with left and right speakers. The position of the headphone unit 12 is manually or automatically controllable. A configuration for controlling the position is not limited, and an arbitrary configuration may be employed.

The display unit 13 is inserted in the base member unit 10 and arranged in front of the eyes 1 of the user. As shown in FIG. 2, the display unit 13 includes an image display mechanism 20 that emits and guides image light to the eyes 1 of the user.

In the present embodiment, the image display mechanism 20 has a display 21 that emits the image light and a lens system 22 that guides the image light emitted from the display 21 to the eyes 1 of the user. As the display 21, an arbitrary display device using a liquid crystal, an EL (Electro-Luminescence), or the like may be, for example, used. When an image is displayed on the display 21, light emitted from the display 21 corresponds to the image light.

Note that the image light is emitted from the display so as to be diffused. That is, the image light is emitted as diffused light. For example, when the image light emitted so as to be diffused is appropriately guided to the eyes 1 of the user by the lens system 22, an image constituted by the image light is made visually recognizable in a focused state.

The lens system 22 has a left-eye lens system 22a arranged in front of a left eye 1a and a right-eye lens system 22b arranged in front of a right eye 1b. The configuration of each lens system 22 is arbitrarily and is not limited to a case in which one lens is arranged. A plurality of various lenses such as Fresnel lenses or a plurality of arbitrary optical members such as optical filters may be arranged.

As schematically shown by arrows in FIG. 2, a drive mechanism 26 (see FIG. 3) capable of moving each of the display 21, the left-eye lens system 22a, and the right-eye lens system 22b is provided in the present embodiment. By the operation of the drive mechanism 26, it is possible to arbitrarily change the position or attitude (direction) of the display 21, the position or attitude (direction) of the left-eye lens system 22a, and the position or attitude (direction) of the right-eye lens system 22b independently of each other.

As shown in, for example, FIG. 2, it is assumed that a vertical direction, a horizontal direction, and a depth direction (a direction toward the display 21) are an X direction, a Y direction, and a Z direction, respectively, when the display 21 is seen from the eyes 1 of the user. The drive mechanism 26 is capable of performing a drive operation such as parallel movements along respective axis directions and rotation based on respective axes with respect to the display 21 or each lens system 22. The specific configuration of the drive mechanism 26 is not limited, and an arbitrary actuator mechanism as described above may be used.

In the present embodiment, each of the display 21, the left-eye lens system 22a, and the right-eye lens system 22b corresponds to a part of the image display mechanism 20. That is, the movement of each of the display 21, the left-eye lens system 22a, and the right-eye lens system 22b corresponds to the movement of at least a part of the image display mechanism 20.

The imaging mechanism 15 has a left-eye camera 23a that shoots the left eye 1a of the user and a right-eye camera 23b that shoots the right eye 1b of the user. Each of the left-eye camera 23a and the right-eye camera 23b is installed at a prescribed position of the HMD 100, specifically, at a prescribed position of the base member unit 10. Accordingly, when the relative position of the base member unit 10 with respect to the eyes 1 of the user changes, the relative positons of the left-eye camera 23a and the right-eye camera 23b with respect to the eyes 1 of the user also change.

Note that the left-eye camera 23a and the right-eye camera 23b are arranged at positions at which the left eye 1a and the right eye 1b of the user are capable of being shot directly, that is, without the interposition of the left-eye lens system 22a and the right-eye lens system 22b. The left-eye camera 23a and the right-eye camera 23b are arranged so as to be directed obliquely from, for example, a downward side. Of course, the left and right cameras may be arranged so as to be directed to the eyes 1 of the user from other directions.

As the left-eye camera 23a and the right-eye camera 23b, digital cameras including image sensors such as CMOS (Complementary Metal-Oxide Semiconductor) sensors and CCD (Charge Coupled Device) sensors are, for example, used. Further, infrared cameras installing infrared illumination such as an infrared LED may be, for example, used.

The cover unit 14 shown in FIGS. 1A and 1B is attached to the base member unit 10 and configured so as to cover the display unit 13. The HMD 100 thus configured functions as an immersive head mount display configured so as to cover the visual field of the user. By wearing the HMD 100, the user is allowed to experience, for example, virtual reality (VR) or the like.

Figure 3:
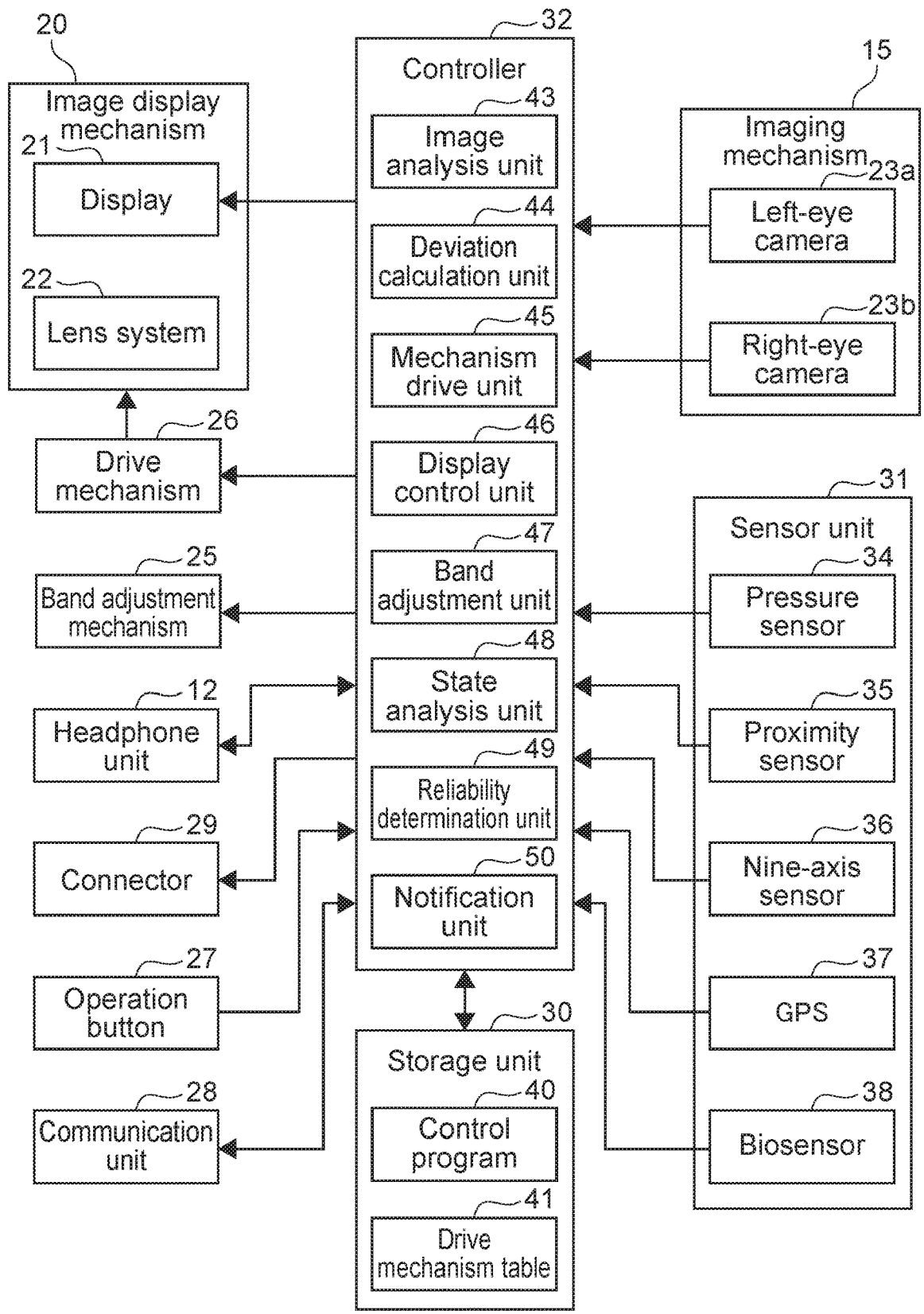
FIG. 3 is a block diagram showing a functional configuration example of the HMD according to the present embodiment.

FIG. 3 is a block diagram showing a functional configuration example of the HMD 100 according to the present embodiment. The HMD 100 further has an operation button 27, a communication unit 28, a connector 29, a storage unit 30, a sensor unit 31, and a controller 32.

The operation button 27 is provided at, for example, a prescribed position of the base member unit 10. By the operation button 27, an operation to turn on/off a power supply or operations related to various functions of the HMD 100 such as a function related to an image display or a sound output and a network communication function may be performed.

The communication unit 28 is a module for performing network communication, near field communication, or the like with other devices. A wireless LAN module such as WiFi or a communication module such as Bluetooth™ is, for example, provided.

The connector 29 is a terminal for connection with other devices. A terminal such as a USB (Universal Serial Bus) and a HDMI™ (High-Definition Multimedia Interface) is, for example, provided. Further, during charging, the connector 29 is connected to the charging terminal of a charging dock (cradle) to be charged.

The sensor unit 31 includes a pressure sensor 34, a proximity sensor 35, a nine-axis sensor 36, a GPS 37, and a biosensor 38. The pressure sensor 34 is provided at, for example, prescribed positions of the temporal band 17 and the parietal band 18 shown in FIGS. 1A and 1B. By the pressure sensor 34, it is possible to measure pressure applied from the temporal band 17 and the parietal band 18 to the head.

The proximity sensor 35 is provided at a prescribed position on the inner periphery side of the attachment band unit 11, and its detection result is used to determine the attachment/detachment of the HMD 100. The nine-axis sensor 36 includes a three-axis acceleration sensor, a three-axis gyro sensor, and a three-axis compass sensor. By the nine-axis sensor 36, it is possible to detect acceleration, angular speed, and directions in three axes. The GPS 37 acquires information regarding the current place of the HMD 100. These sensors are provided at, for example, prescribed positions of the base member unit 10. Of course, these sensors may be provided at other positions.

The biosensor 38 acquires biological information regarding the user. As the biosensor 38, a brain wave sensor, a myoelectric sensor, a pulse sensor, a sweat sensor, a temperature sensor, a blood flow sensor, a body motion sensor, or the like is, for example, provided. These sensors are provided at prescribed positions of the HMD 100 so that their detection terminal parts are in contact with prescribed positions of the body. For example, the brain wave sensor is provided to be capable of being in contact with a prescribed position of the head. The pulse sensor is provided at a position at which the pulse sensor is capable of being in contact with a blood vessel of the neck.

The types of sensors provided as the sensor unit 31 are not limited, and arbitrary sensors may be provided. A temperature sensor, a humidity sensor, or the like capable of measuring temperature, humidity, or the like of an environment in which the HMD 100 is used may be, for example, provided.

The storage unit 30 is a non-volatile storage device, and a HDD (Hard Disk Drive) or the like is, for example, used as such. The storage unit 30 stores a control program 40 for controlling the entire operation of the HMD 100. Further, the storage unit 30 stores a mechanism drive table 41. The mechanism drive table 41 is a table referred to when at least a part of the image display mechanism 20 is moved on the basis of eye information regarding the user, and will be described in detail later. A method for installing the control program 40 and the mechanism drive table 41 in the HMD 100 is not limited.

The controller 32 controls the operations of the respective blocks of the HMD 100. The controller 32 has, for example, hardware configurations for a computer such as a CPU and a memory (RAM, ROM). Various processing is performed when the CPU loads the control program 40 stored in the storage unit 30 into the RAM and performs the same.

As the controller 32, a PLD (Programmable Logic Device) such as a FPGA (Field Programmable Gate Array), any device such as an ASIC (Application Specific Integrated Circuit), or the like may be, for example, used.

In the present embodiment, an image analysis unit 43, a deviation calculation unit 44, a mechanism drive unit 45, a display control unit 46, a band adjustment unit 47, a state analysis unit 48, a reliability determination unit 49, and a notification unit 50 are realized when the CPU of the controller 32 performs a program according to the present embodiment. Further, an information processing method according to the present embodiment is performed by these function blocks. Note that dedicated hardware such as an IC (Integrated Circuit) may be appropriately used to realize the respective function blocks.

The image analysis unit 43 analyzes eye images of the user shot by the imaging mechanism 15. That is, the image analysis unit 43 acquires a left-eye image shot by the left-eye camera 23a and a right-eye image shot by the right-eye camera 23b and analyzes these images. All the left-eye image and the right-eye image input to the image analysis unit 43 and various characteristic parameters detected as a result of the analysis of the image analysis unit 43 are included in eye information regarding the eyes 1 of the user in the present embodiment. On the basis of these eye information items, it is possible to dynamically estimate, for example, the positions of the eyes 1 of the user. In the present embodiment, the image analysis unit 43 functions as an acquisition unit.

Figure 4:
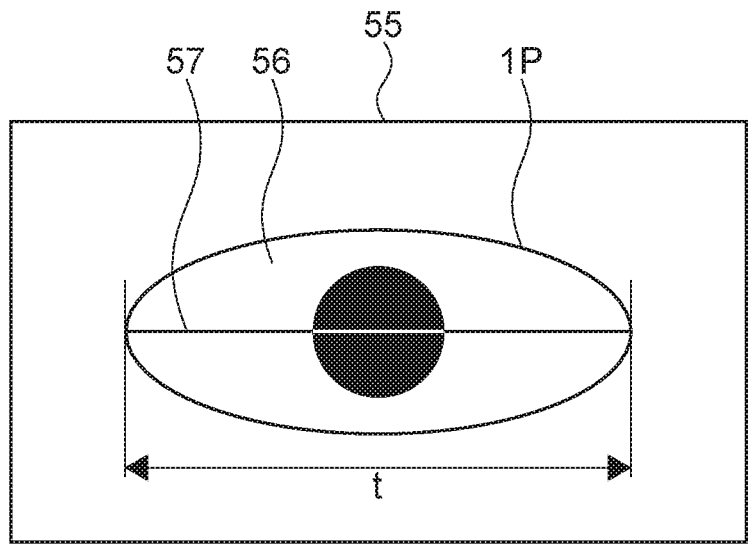
FIG. 4 is a schematic view for describing an example of eye information regarding the eyes of a user.

FIG. 4 is a schematic view for describing an example of eye information regarding the eyes 1 of the user. As eye information, it is possible to detect, for example, the shape, size, position, inclination, or the like of an eye 1P of the user in an eye image 55. Specifically, an eye region 56 of the user is detected, and its shape, size, position, and inclination are detected. As shown in, for example, FIG. 4, a size t of a long axis 57 of the eye 1P of the user may be used as the size of the eye region 56 of the user. Further, the inclination of the long axis 57 of the eye 1P of the user with respect to a horizontal direction may be used as the inclination of the eye region 56 of the user.

Note that the long axis 57 of the eye 1P or the user is an axis connecting the position of the right end and the position of the left end of each of the eyes 1 of the user to each other in a substantially horizontal direction when the vertical direction of the face (for example, a direction from the parietal part to the jaw) of the user becomes a substantially vertical direction and the horizontal direction of the face (for example, a direction in which positions at the same height of both ears are connected to each other) becomes a substantially horizontal direction.

Further, information such as information as to whether the entire eye region 56 of the user is included in the eye image 55 and information as to which of the vertical and horizontal directions is a direction in which the eye region 56 is missing is also included in the eye information regarding the eyes 1 of the user. Besides, arbitrary information such as a visual line direction, a pupil size, an iris pattern, and an eyelash shape may be detected as the eye information.

Note that a method for analyzing an eye image to detect characteristic parameters is not limited. An arbitrary segmentation technology or an arbitrary image analysis technology may be used. Further, a machine learning algorithm using a DNN (Deep Neural Network) such as a RNN (Recurrent Neural Network), a CNN (Convolutional Neural Network), and a MLP (Multilayer Perceptron) may be used.

The deviation calculation unit 44 calculates a deviation amount from the initial state of the eyes 1 of the user on the basis of eye information regarding the user acquired by the image analysis unit 43. The initial state of the eyes 1 of the user and a deviation from the initial state will be described later.

The mechanism drive unit 45 outputs a control signal to the drive mechanism 26. On the basis of the control signal output from the mechanism drive unit 45, each of the display 21, the left-eye lens system 22a, and the right-eye lens system 22b is moved. In the present embodiment, the deviation calculation unit 44 and the mechanism drive unit 45 function as a movement unit.

The display control unit 46 controls an image display by the image display mechanism 20. By the display control unit 46, arbitrary image processing and display control such as correcting a displayed image and moving the display position of a displayed image are, for example, performed.

The band adjustment unit 47 outputs a control signal to the band adjustment mechanism 25. On the basis of the control signal output from the band adjustment unit 47, the retention force of each of the temporal band 17 and the parietal band 18 is adjusted. In the present embodiment, band adjustment unit 47 functions as an attachment state control unit capable of controlling the attachment state of the HMD 100.

The state analysis unit 48 acquires various state information items on the states of the user or the HMD 100 on the basis of detection results from the sensor unit 31. As the state information regarding the user, information as to whether the user is in a sleeping state or biological information such as body heat, a pulse rate, a brain wave state, muscle movements, a sweat amount, and a concentration state is, for example, acquired. Further, information regarding the current place of the user, more specifically, information as to whether the user is indoors, outdoors, or is in conference, or the like is acquirable.

Further, motion information regarding motion done by the user is acquired. Information during walking, running, moving by train, driving, or the like is, for example, acquired. Information on the types of sports being played or the like is also acquirable. Further, information regarding a posture as to whether the user is sitting, standing, stooping, turning sideways, or turning up is acquired. These state information items on the user are acquirable by, for example, an arbitrary motion analysis technology such as a motion analysis using parameters obtained by machine learning or the like.

Further, as information regarding the apparatus states of the HMD 100, various information items such as an active function, an operation mode, the attachment/detachment of the HMD 100 to/from the user, the attachment position of the HMD 100 with respect to the user, a battery remaining amount, connection with a charging dock, and apparatus temperature are, for example, acquired. Further, as information regarding use environments, various information items such as temperature, humidity, a current place, weather, date and time are also acquirable. Sensors, devices, or the like for acquiring these information items only have to be appropriately provided in the HMD 100. Further, a method for analyzing state is not limited, and a machine learning algorithm may be, for example, used. In the present embodiment, the state analysis unit 48 functions as a state acquisition unit.

The reliability determination unit 49 determines the reliability of a detection result by the sensor unit 31. The determination will be described later.

The notification unit 50 notifies the user of various information items. The notification of prescribed information is realized by, for example, an arbitrary method such as displaying an image or text on the display 21, outputting a sound from the headphone unit 12, shining light on (blinking) a prescribed position at the outer part of the base member unit 10 or the cover unit 14, and vibrating the base member unit 10 or the like with an arbitrary vibration mechanism. It is possible to make, for example, a notification of arbitrary information such as information regarding the use of the HMD 100, information regarding content, and information regarding a detection result by the sensor unit 31.

Operation of Image Display Apparatus

Figure 5:
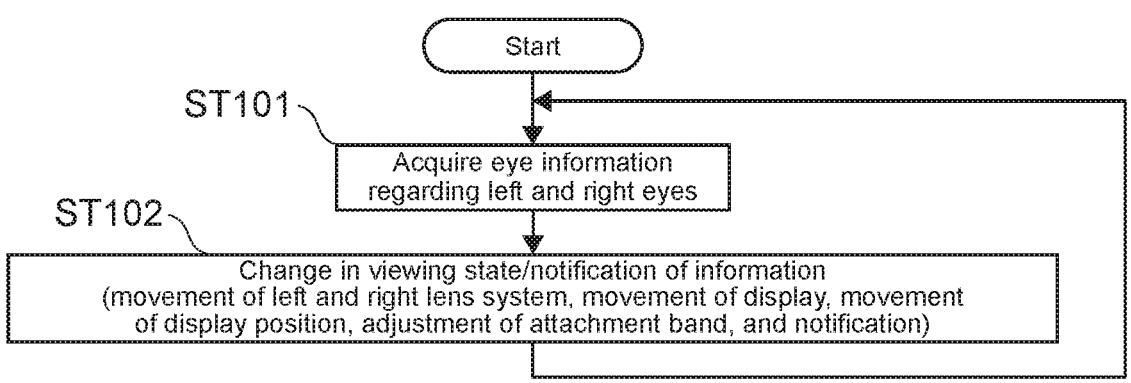
FIG. 5 is a flowchart showing the outline of a basic operation performed by the HMD.

The operation of the HMD 100 that is an image display apparatus according to the present embodiment will be described. FIG. 5 is a flowchart showing the outline of a basic operation performed by the HMD 100. First, eye information regarding the eyes 1a and 1b of the user is acquired by the image analysis unit 43 (step 201). On the basis of the acquired eye information, a change in viewing state and the notification of prescribed information are performed (step 102).

The change in viewing state includes, for example, arbitrary processing to change a state in which content is viewed, such as moving the left and right lens systems 22a and 22b, moving the display 21, moving the display position of as image, and adjusting the attachment band unit 11. Further, the notification itself of a prescribed alert or the like is also included in the change in viewing state.

That is, in the HMD 100 of the present embodiment, various processing is performed on the basis of eye information regarding the eyes 1 of the user. Thus, it is possible to realize high-quality viewing experience for the user. Hereinafter, a specific example to which the basic operation shown in FIG. 5 is applied will be described.

Figure 6:
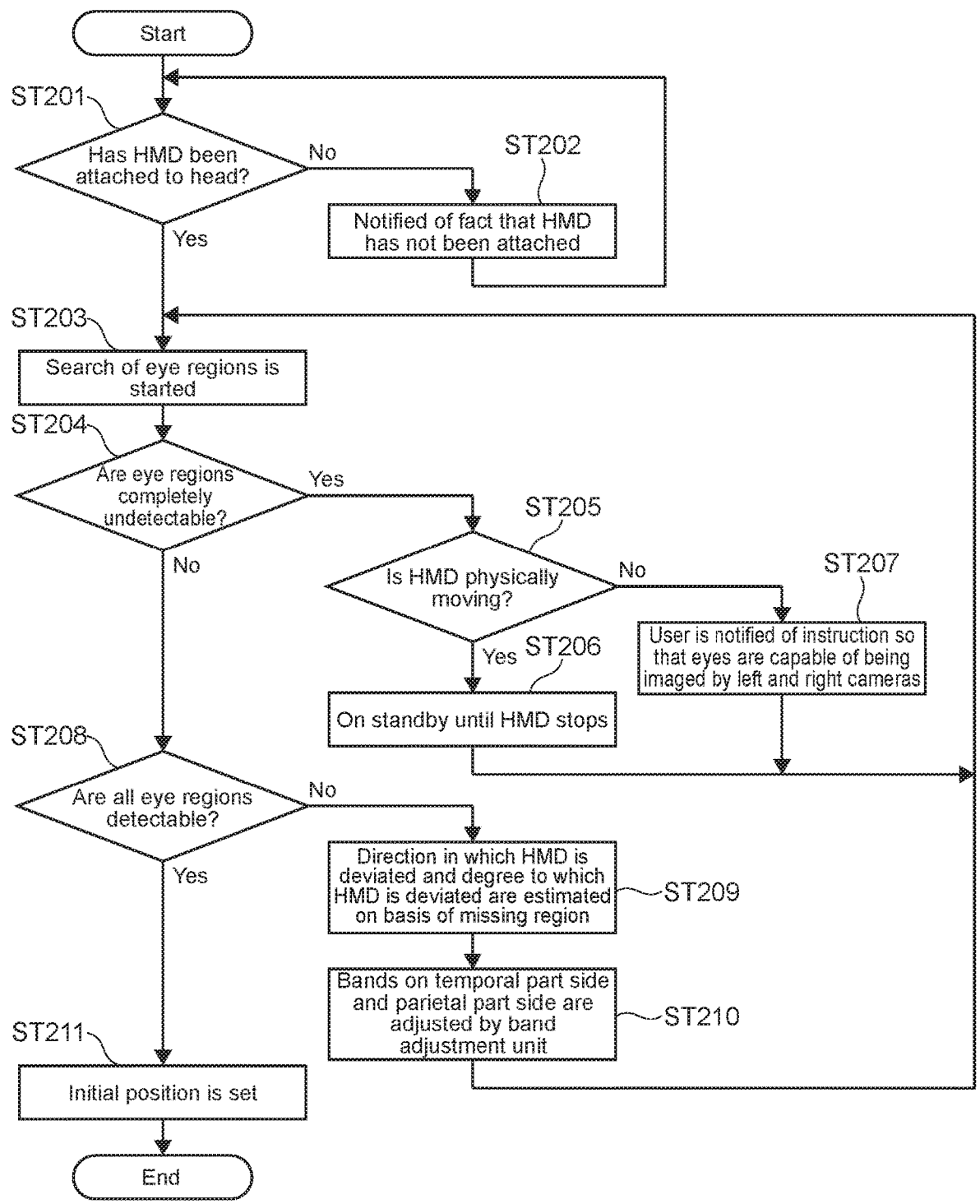
FIG. 6 is a flowchart showing a processing example performed when the use of the HMD is started.

FIG. 6 is a flowchart showing a processing example performed when the use of the HMD 100 is started. When the user turns on the power supply of the HMD 100, a determination is first made as to whether the HMD 100 has been attached to the head of the user (step 201). The determination is made by the state analysis unit 48 shown in FIG. 3 on the basis of a detection result by the proximity sensor 24.

When the HMD 100 has not been attached (No in step 201), the user is notified of the fact by the notification unit 50 shown in FIG. 3 (step 202). A notification method is not limited. For example, a sound may be output from the headphone unit 12, or prescribed colored light may be output to the outside of the base member unit 10 or the cover unit 14. Alternatively, processing to make the entire display 21 blink may be performed. Of course, the notification of the fact to the user may be performed by the vibration of the base member unit 10 or the like based on a vibration mechanism.

When the HMD 100 has been attached (Yes in step 201), the search of the eye regions of the user is started (step 203). Specifically, the detection of the eye region 56 of the left eye 1a and the eye region 56 of the right eye 1b is performed by the image analysis unit 43 shown in FIG. 3. Then, a determination is made as to whether the left and right eye regions 56 are not completely detectable (step 204).

When the left and right eye regions 56 are not completely detectable (Yes in step 204), a determination is made as to whether the HMD 100 is physically moving (step 205). The determination is performed by the state analysis unit 48 on the basis of, for example, a detection result by the nine-axis sensor.

Besides, as determination processing in step 205, it is also possible to provide a proximity camera for finger print shooting or the like in the sensor unit 31 and shoot the skin or the like of the user with the proximity camera to measure the movement direction and distance of a skin pattern. For example, it is also possible to estimate the movement distance on the basis of a cumulative movement distance since calibration. Further, the determination as to whether the HMD 100 is physically moving may be made on the basis of an image shot by a camera (including IoT or the like) provided at a distant place. For example, face detection is performed with respect to the face wearing the HMD 100 to detect the position of a LED marker attached to the HMD. It is possible to determine whether the HMD has physically moved from the result of the face detection and the positional relationship of the LED marker of the HMD.

When the HMD 100 is moving (Yes in step 205), the processing is on standby until the HMD 100 stops (step 206). That is, the processing is on standby until the state of the user or the HMD 100 is settled. After being on standby for a prescribed time, the processing returns to step 203. When the HMD 100 is not moving (No in step 205), the user is notified of an instruction to change an attachment state so that the eyes 1 of the user are capable of being shot by the left-eye camera 23a and the right-eye camera 23b (step 207). For example, announcement or the like urging the user to manually correct the position of the HMD 100 is output. Then, the processing returns to step 203.

When the left and right eye regions 56 are detectable (No in step 204), a determination is made as to whether all the left and right eye regions 56 are detectable (step 208). When there is any missing region in the left and right eye regions 56 (No in step 208), a direction in which the HMD 100 is deviated and the degree to which the HMD 100 is deviated are estimated on the basis of the missing region (step 209).

A control signal is generated on the basis of the deviation amount estimated in step 209 and output to the band adjustment mechanism 25 by the band adjustment unit 47. That is, the control signal is output to the band adjustment mechanism 25 so as to create an attachment state in which the eyes 1 of the user are capable of being shot by the left-eye camera 23a and the right-eye camera 23b. Then, the lengths or positions of the temporal band 17 and the parietal band 18 of the attachment band unit 11 are changed by the band adjustment mechanism 25 (step 210).

When the fact that the HMD 100 is deviated in the horizontal direction is, for example, estimated in step 209, the length or the like of the temporal band 17 is adjusted. When the fact that the HMD 100 is deviated in the vertical direction is estimated, the length or the like of the parietal band 18 is adjusted. Of course, the adjustment is not limited to such processing. Note that the band on the temporal part side and the band on the parietal part side shown in FIG. 6 correspond to the temporal band 17 and the parietal band 18, respectively. When the adjustment of the attachment band unit 11 is completed, the processing returns to step 203.

When all the left and right eye regions 56 are detectable (Yes in step 208), the setting of an initial position is performed (step 211).

Figure 7:
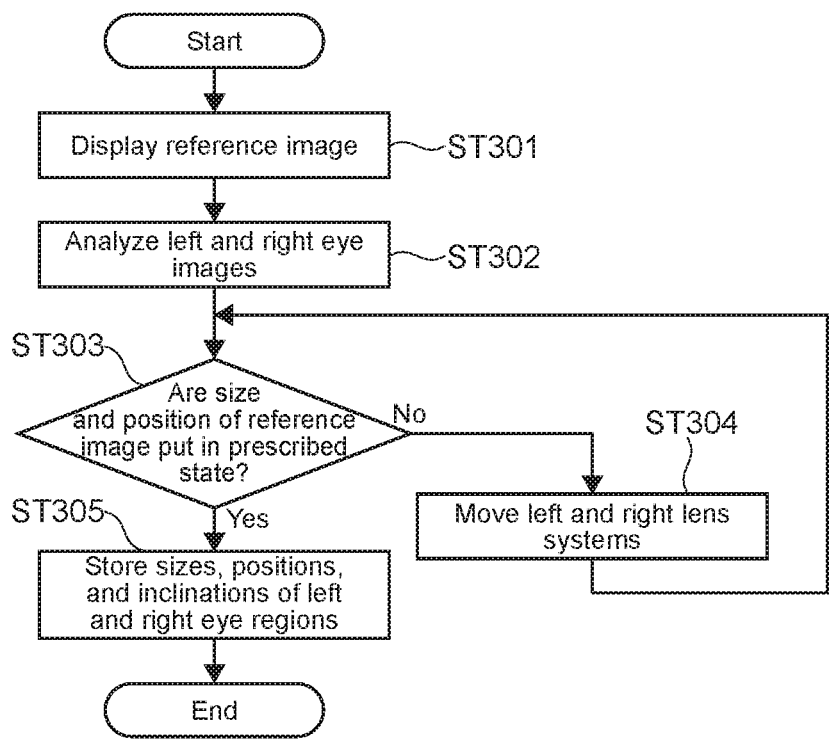
FIG. 7 is a flowchart showing a setting example of an initial position.
Figure 8:
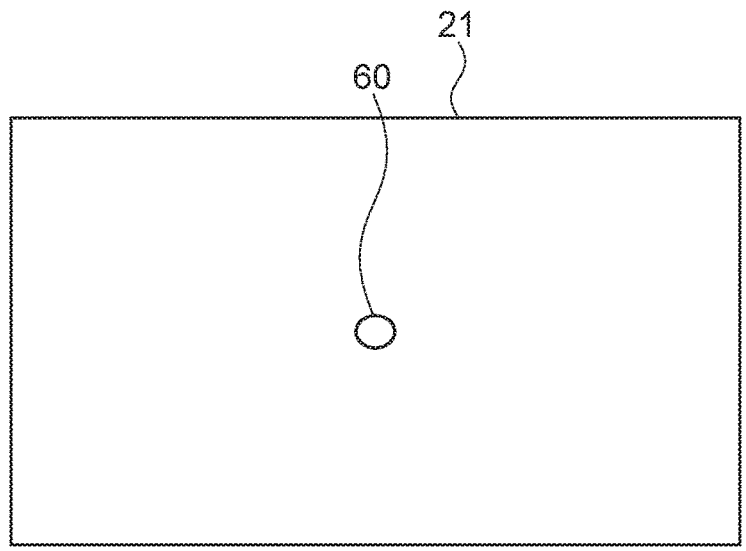
FIGS. 8A to 8C are schematic views for describing the setting example of the initial position shown in FIG. 7.
Figure 8:
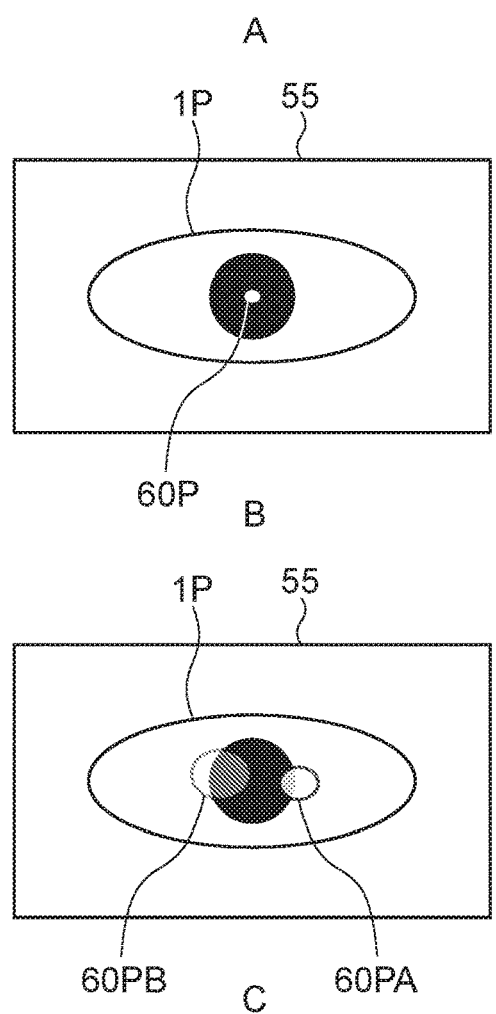

FIG. 7 is a flowchart showing a setting example of an initial position. FIGS. 8A to 8C are schematic views for describing the setting example of the initial position shown in FIG. 7. The setting of the initial position refers to the setting of the states of the left and right eyes 1 of the user with respect to the image display mechanism 20 to an initial state in which content is capable of being appropriately viewed when the use of the HMD 100 is started. In the present embodiment, the initial state in which the content is capable of being appropriately viewed corresponds to "a case in which the eyes of the user are put in a prescribed state." Further, the initial state refers also to a prescribed viewing state.

First, a reference image 60 is displayed at a prescribed position of the display 21 (step 301). As shown in, for example, FIG. 8A, a point image colored in green or the like is displayed as the reference image 60 at a substantially central area of the display 21. Then, left and right eye images 55 shot in this state are analyzed (step 302).

A determination is made as to whether a reference image 60P is arranged at a prescribed size and a prescribed position with respect to the left and right eyes 1P of the user in the left and right eye images 55. Specifically, a determination is made as to whether the size and position of the reference image 60P are put in a prescribed state (step 303). In the present embodiment, a determination is made as to whether the reference image 60P is displayed minimally and clearly at the center of the pupil in the left and right eye images 55. This state corresponds to a state in which an image of the diffused and emitted image light of the reference image 60 is formed minimally and a state in which the left and right eyes 1 of the user are focused with respect to the reference image 60 displayed on the display 21. That is, this state is a state in which the above initial state is realized.

When the size and the position of the reference image 60P are not put in the prescribed state in the left and right eye images 55, the left and right lens systems 22a and 22b are moved (step 304). That is, a control signal is generated and output to the drive mechanism 26 by the mechanism drive unit 45. On the basis of the input control signal, the drive mechanism 26 moves the left and right lens systems 22a and 22b.

When a reference image 60PA is deviated rightward with respect to the center of the pupil and expanded in size as shown in, for example, FIG. 8C, it is determined that focus is not achieved. Then, the lens system 22 is appropriately moved on the basis of XYZ axes so as to create a focused state (a state shown in FIG. 8B). Similarly, when a reference image 60PB is deviated leftward with respect to the center of the pupil and expanded in size as shown in FIG. 8C, the lens system 22 is appropriately moved on the basis of the XYZ axes so as to create a focused state.

By, for example, moving the lens system 22 in a Z direction, it is possible to control the size of the reference image 60P. Further, by moving the lens system 22 in parallel in an XY plane direction or by inclining the lens system 22 along the respective axes, it is possible to control the position of the reference image 60P. Besides, an arbitrary drive method capable of controlling the size and position of the reference image 60P may be performed.

Note that when the reference image 60P becomes minimum at a central position after the processing of steps 303 and 304 is repeatedly performed by a prescribed number of times, it may be determined that the prescribed state (that is, the initial state) in step 303 is realized. Alternatively, when prescribed allowable ranges are set with respect to the position and the size and the size and position of the reference image 60P are included in the allowable ranges, it may be determined that the prescribed state (that is, the initial state) in step 303 is realized.

When it is determined that the reference image 60P is put in the prescribed state, that is, when the initial state is realized (Yes in step 303), the size, position, and inclination of each of left and right eye regions 56 are stored in the storage unit 30 (step 305). For example, the size (for example, the number of pixels) of the long axis of the eye region 56 shown in FIG. 4 is stored as the size of each of the eye regions 56. Further, the position and inclination (for example, coordinate values of pixels) of the long axis 57 are stored as the position and inclination of each of the eye regions 56. Besides this, the sizes and positions of the entire eye regions 56 may be stored as they are.

In the present embodiment, eye information acquired when the initial state is realized, that is, eye images shot when the initial state is realized or various characteristic parameters calculated from the eye images correspond to reference eye information. Further, the eye images shot when the initial state is realized correspond to reference eye images.

By performing the setting of the initial position as described above, it is possible to substantially prevent influence caused by a personal difference in the shape of the face or head of the user or a personal difference in the distance between left and right eyes and realize a high-quality viewing system for each user who uses the HMD 100.

Note that the shape, size, color, or the like of the reference image 60 is not limited and may be arbitrarily designed. For example, an image of a building, a vehicle, or a balloon, a prescribed logo mark, or the like may be displayed as the reference image 60. Further, a condition which is set with respect to the reference image 60P in the eye images 55 and on which the realization of the state is determined is not also limited. That is, a condition on the size or position of the reference image 60P may be arbitrarily set, and a parameter or the like (such as a brightness value and a blurring degree) other than the size or position may be employed as the condition on the realization of the initial state.

In the case of, for example, the reference image 60 having a simple shape like the point image shown in FIG. 8A, a determination is made as to whether the initial state is realized on the basis of the size of the reference image 60P in the eye images 55. On the other hand, in a case in which a reference image 60 having a complicated shape such as a balloon is used, it is possible to determine whether the initial state is realized on the basis of not only the size of the reference image 60P in the eye images 55 but also focus (a blurring degree). Of course, a condition for determining the realization of the initial state is not limited to the above example.

Further, in step 304, the display 21 may be moved to realize the initial state. Alternatively, the display position of the reference image 60 may be moved. For example, in a case in which the display position of the reference image 60 is changed to perform the setting of the initial position, a content image or the like only has to be displayed at a position corresponding to the position of the reference image 60 obtained when the initial state is realized.

The setting of the initial position refers to processing to set focus or a display position before content is viewed. In the present technology, it is possible to dynamically change the viewing state not only at the starting of content but also at the running (viewing) of the content as will be described below.

Figure 9:
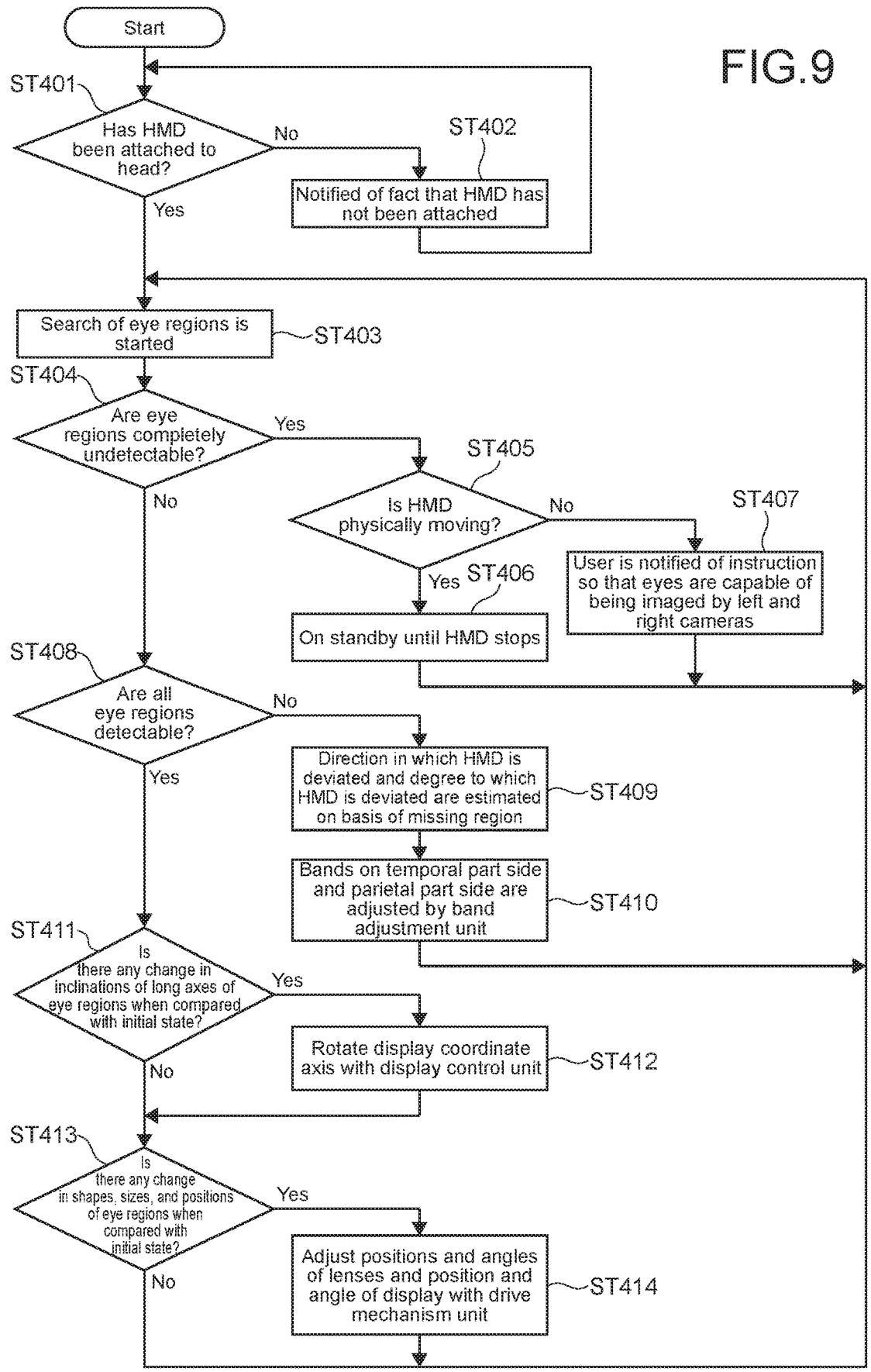
FIG. 9 is a flowchart showing an operation example of the HMD after the setting of the initial position.

FIG. 9 is a flowchart showing an operation example of the HMD 100 after the setting of the initial position. Steps 401 to 410 are substantially the same as steps 201 to 210 shown in FIG. 6. Immediately after the setting of the initial position is completed, the processing proceeds from Yes in step 408 to step 411 in most cases. Note that the user is highly likely to walk or run in VR (Virtual Reality) during the viewing of content. In this case, the HMD 100 could be deviated. However, it is possible to cause the processing to automatically proceed to step 411 by performing the processing of steps 401 to 410.

In step 411, a determination is made by the deviation calculation unit 44 shown in FIG. 3 as to whether there is any change in the inclinations of the long axes 57 of the eye regions 56 in comparison with the inclinations of the long axes 57 in the initial state. When there is a change in the inclinations of the long axes 57, the display position of an image (a content image) displayed on the display 21 is moved by the display control unit 46. Specifically, a display coordinate axis with respect to the display 21 is rotated at a rotation angle corresponding to the change in the inclinations of the long axes 57 (step 412). Thus, it is possible to correct the inclination of an image caused by the rotation deviation or the like of the HMD 100.

When there is no change in the inclinations of the long axes 57, a determination is made by the deviation calculation unit 44 as to whether there is any change in the shapes, sizes, and positions of the eye regions 56 in comparison with the shapes, sizes, and positions of the eye regions 56 in the initial state (step 413). When there is no change in the shapes, sizes, and positions of the eye regions 56, the processing returns to step 403 without changing the viewing state.

When there is a change in the shapes, sizes, and positions of the eye regions 56, a control signal corresponding to the change is generated and output to the drive mechanism 26 by the mechanism drive unit 45. Thus, the respective positions or angles of the display 21, the left-eye lens system 22a, and the right-eye lens system 22b are adjusted. (step 414). Specifically, the respective positions or angles of the display 21, the left-eye lens system 22a, and the right-eye lens system 22b are adjusted so that the state of the eyes 1 of the user with respect to the image display mechanism 20 comes close to the initial state.

Therefore, in the present embodiment, the mechanism drive table 41 stored in the storage unit 30 is referred to. The mechanism drive table 41 is a table in which deviation amounts calculated by the deviation calculation unit 44 and movement amounts of the display 21, the left-eye lens system 22a, and the right-eye lens system 22b are associated with each other. The mechanism drive table 41 is created in advance by calibration or the like and stored in the storage unit 30.

For example, a two-dimensional lookup table showing the relationships between deviation amounts and the combinations of movement amounts of the display and the lens system with respect to each of the left and right eyes is created. Alternatively, a three-dimensional lookup table showing the relationships between deviation amounts, movement amounts of the display, and movement amounts of the lens system may be created. Further, a condition for moving the display, a condition for moving the lens system, or the like is set, and a device to be moved may be appropriately determined. In this case, a plurality of table information items used according to a determined result may be created.

Of course, the movement of the display 21 or the lens system 22 may be performed without using table information. For example, movement amounts may be calculated by computation as occasion demands on the basis of deviation amounts to appropriately control the operation of the drive mechanism 26.

Figure 10:
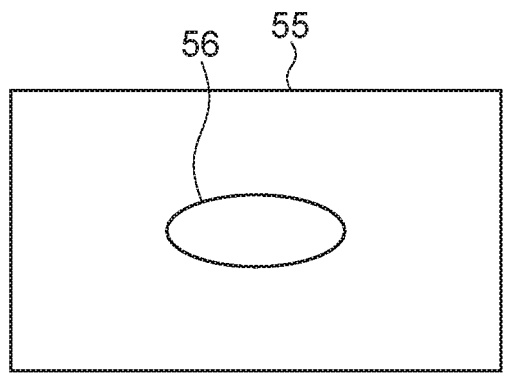
FIGS. 10A to 10C are schematic views showing movement examples of a lens system according to a deviation amount.
Figure 10:
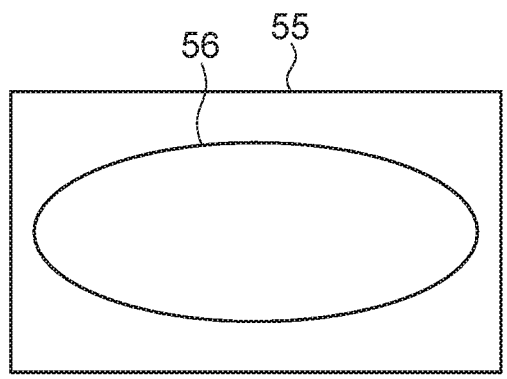
Figure 10:
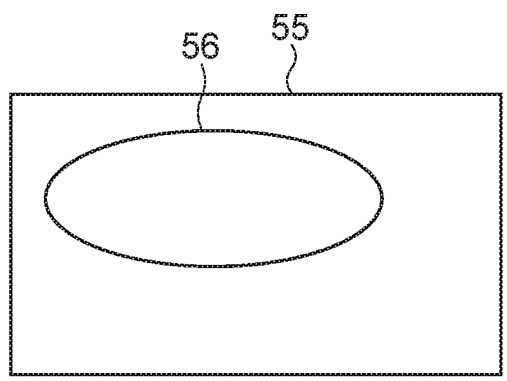

FIGS. 10A to 10C are schematic views showing movement examples of the lens system 22 according to a deviation amount. As shown in, for example, FIG. 10A, it is assumed that the size of an eye region 56 in an eye image 55 becomes smaller than that of the eye region 56 in the initial state. In this state, the base member unit 10 in which the left-eye camera 23a and the right-eye camera 23b are installed is moved in a direction away from the eyes 1 of the user. In order to correct influence caused by this deviation, that is, in order to bring this state close to the initial state, the left and right lens systems 22 are caused to come close to the eyes of the user.

As shown in FIG. 10B, it is assumed that the size of an eye region 56 in an eye image 55 becomes greater than that of the eye region 56 in the initial state. In this state, the base member unit 10 in which the left-eye camera 23a and the right-eye camera 23b are installed is moved in a direction close to the eyes 1 of the user. In order to correct influence caused by this deviation, that is, in order to bring this state close to the initial state, the left and right lens systems 22 are caused to get away from the eyes of the user.

As shown in FIG. 10C, it is assumed that the position of an eye region 56 in an eye image 55 is deviated from the position of the eye region 56 in the initial state. In this state, the base member unit 10 in which the left-eye camera 23a and the right-eye camera 23b are installed is moved in the XY plane. In order to correct influence caused by this deviation, that is, in order to bring this state close to the initial state, the left and right lens systems 22 are caused to move in a direction in which the deviation is corrected. Alternatively, it is also possible to adjust the angles of the left and right lens systems 22 to correct the positional deviation of the eye region 56.

That is, in the present embodiment, at least a part of the image display mechanism 20 is moved on the basis of the differences between reference eye images shot in the initial state and eye images shot during the viewing of content. Note that a method for moving at least a part of the image display mechanism 20 according to a deviation is not limited to the methods shown in the examples of FIGS. 10A to 10C and an arbitrary drive method (correction method) may be performed. For example, it is also possible to perform processing to move the display 12 or the lens system 22 so that the sizes of the left and right eye regions 56 become substantially the same.

As described above, a change in viewing state and a prescribed notification are performed on the basis of eye information regarding the eyes 1 of the user in the HMD 100 according to the present embodiment. That is, the movement of at least a part of the image display mechanism 20, the adjustment of the attachment band unit 11, and the notification of prescribed information are performed on the basis of eye information. Thus, it is possible to realize high-quality viewing experience for, for example, the user who uses the HMD 100.

In the future as well, it is expected that the experience of VR (Virtual Reality) or AR (Augmented Reality) using an HMD or the like will become pervasive. Further, it is also expected that the weight reduction of a used HMD will be advanced, and it will be really important to effectively correct influence caused by the deviation of an HMD. According to, for example, an analog method in which the user manually moves an HMD to be adjusted, it is difficult to adjust a position at which focus is achieved and an image is appropriately viewed and also difficult to determine the most appropriate position for the user himself/herself. As a result, the user struggles to adjust the position of the HMD, and it is highly likely that the viewing of content is disturbed.

In the present embodiment, the movement or the like of the lens system 22 is automatically performed on the basis of eye information regarding the eyes 1 of the user even during the viewing of content. Thus, it is also possible to correct influence caused by a deviation before, for example, being noticed by the user without disturbing the viewing of content. As a result, it is possible to realize extremely high-quality viewing experience. Further, in a case in which a manual adjustment may be needed, it is also possible to determine a deviation amount on the basis of eye information and notify the user of an appropriate adjustment method. Further, it is also possible to notify the user of whether a position is most appropriate. That is, it is possible to give effective guidance to the user.

Examples of a notification method for the user will be described. For example, when it is determined that a deviation is beyond an automatic adjustment, the user is notified of the occurrence of the deviation and urged to make an adjustment. Thus, it is possible to prevent an unintended attachment state from being kept. Specifically, the display of an image or text on the display 21, the output of a sound from the headphone unit 12, the vibration of the base member unit 10 or the like with a vibration mechanism, or the like is performed.

When an image becomes blurred during, for example, the viewing of content, the user notices the blurring. Accordingly, it is also effective to notify the user of the blurring straightforwardly. A notification or alert is displayed using, for example, text at a size at which the text is seeable even in a blurred state or an image, a symbol, a mark, or the like that is recognizable even in a blurred state. Alternatively, a notification or alert is performed by a sound, vibration described above, or the like.

It is also important to naturally perform a notification without disturbing the viewing of the user. A short notification that is not so emphasized is, for example, performed. Alternatively, it is also possible to determine the state of the user from a sensor result by the sensor unit 31 and reflect the determined state of the user on a notification method. On the basis of, for example, the state of sweating, brain waves, or the like, a determination is made as to whether the user notices a notification. When the user does not notice the notification, the notification is emphasized stepwise or other notification methods are performed. For example, when the user does not notice a sound, a vibration function is used in combination with the sound.

When it is determined that the user does not completely notice a notification, it is likely that the user is not viewing content at all. In this case, the awakened degree of the user is measured, and a notification method is appropriately changed on the basis of a measurement result. For example, processing such as emphasizing the notification to make the user awakened, cancelling the content contrary, and turning off the power supply of the HMD 100 itself is assumed.

When it is determined that the HMD 100 is deviated horizontally, it is also possible to give guidance to the user through content to move the head instantaneously to correct the deviation. For example, a sound is used and quickly transmitted from the right ear to the left ear. Alternatively, an image that quickly moves horizontally is displayed on the display 21. The user is caused to feel the movement of any object on the screen through this content and then move the head instantaneously to follow the object. Thus, it is also possible to give guidance to the user to move the head. In addition, it is also possible to give guidance to the user to move the head instantaneously using both a sound and the movement of an image.

It is also possible to change the retention force of the attachment band unit 11 to correct the deviation of the HMD 100. Using, for example, a prescribed button operation, the movement of the head (an increase in acceleration), or a sound input from the user as a trigger, it is also possible to loosen one side and tighten the other side of the attachment band unit 11 to move and restore the entire HMD 100 itself to a normal position.

Figure 11:
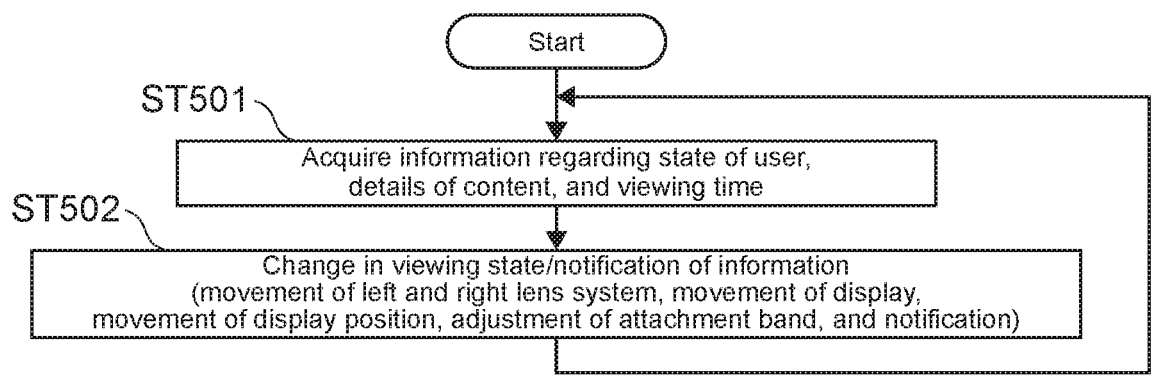
FIG. 11 is a flowchart showing the outline of other processing capable of being performed by the HMD.

FIG. 11 is a flowchart showing the outline of other processing capable of being performed by the HMD 100. As shown in step 501, information regarding the state of the user, the details of displayed content, and a viewing time is acquired. Then, as shown in step 502, a change in viewing state and a prescribed notification are performed on the basis of these information items.

That is, processing or the like to move at least a part of the image display mechanism 20 may be performed on the basis of information different from eye information. Of course, these information items and eye information may be combined together to perform a change in viewing state and a prescribed notification. Thus, it is possible to realize high-quality viewing experience.

In the above description, the lens system 22 or the like is moved so that the state of the eyes 1 of the user comes close to the initial state when a deviation occurs. Besides this case, the movement of the display 21 or the lens system 22 may be performed so that the state of the eyes 1 of the user with respect to the image display mechanism 20 is put in another state different from the initial state. That is, the viewing state may be changed to a state in which focus is not achieved intentionally, or may be changed so as to make the display position of an image deviated.

For example, when content refers to a video game or the like, it is also possible to cause defocusing intentionally to make a view blurred in water or a dusty environment. The blurring of a view is performed in, for example, a case in which the user is covered with dust from a forward-traveling vehicle, a case in which the user dives into water, or the like in a racing game. Further, it is also possible to adjust the blurred degree of a view according to the attachment/detachment of an appropriate item (for example, glasses or the like) inside VR.

Further, it is also possible to adjust the blurred degree of a view according to the physical condition or awakened state of an avatar in content. For example, it is also possible to sense the state of the user and reflect the sensed state of the user on an avatar, or is possible to adjust a blurred degree according to the state of an avatar in content. The blurring of a view or the like is performed in a case in which the user is damaged or is in a critical condition in, for example, a battle game, a shooting game, or the like. It is also possible to make only the right eye blurred when the right eye of the user gets hit. Further, it is also possible to make a view blurred when the user feels strong sleepy.

As described above, the viewing state is changed according to the details of content, whereby it is possible to enhance a sense of realism of the content and realize high-quality viewing experience.

Further, in medical fields or the like, it is also possible to realize the experience of the visual fields of foresighted persons, near-sighted persons, astigmatic persons, and persons with visual and hearing disabilities, or the like. For example, when the user wearing the HMD 100 selects a visual field that he/she wants to experience, the lens system 22 or the like is moved on the basis of eye information so as to realize the visual field. For example, the lens system 22 or the like is moved so as to make a focal distance get close to the user when the user selects the visual field of a foresighted person and moved so as to make the local distance get away from the user when the user selects the visual field of a farsighted person. When the user selects the visual field of a foresighted person, the lens system 22 or the like is appropriately moved according to the distance of an object. Note that it is also possible to automatically adjust visibility during the attachment of the HMD 100 by moving the lens system 22 or the like.

Further, it is also possible to apply the present technology to ordinary glasses. For example, it is possible to accurately change a correction frequency, a visual field, or the like by moving lenses or the like provided in glasses on the basis of eye information.

The viewing state is changed on the basis of the viewing time of content. For example, when content is used over a specified time, it is possible to make a view blurred to cause the user to be aware of fatigue and have a rest. For example, as the used time of content comes close to a content setting time (90 minutes or the like), the user is caused to be gradually put in a near-sighted state (caused to have a shorter focal distance) and feel eyestrain. Such processing corresponds to the power mode of a TV. Further, on this occasion, it is also possible to determine whether the user gets tired on the basis of biological information (brain waves, pulses, blood flows, or the like). Further, it is also possible to display a message such as "enter an eyestrain mode" at a corner of the display 21. Further, in, for example, a case in which the HMD 100 is used over a specified time, a case in which it is determined that the user gets tired on the basis of biological information, or the like, it is also possible to offer content such as an image or music for relaxing eyestrain to the user.

The viewing state is changed on the basis of state information regarding the state of the user. The processing is performed according to an awakened degree described above or performed according to biological information. For example, when a mechanism or the like that monitors the physical condition of the user wearing the HMD 100 is provided, a display state may be changed using a monitoring result. For example, when it is determined that the user gets tired on the basis of biological information, the user is caused to be gradually put in a near-sighted state (caused to have a shorter focal distance) and feel eyestrain. Further, it is also possible to display a message such as "enter an eyestrain mode" at a corner of the display 21. Further, it is also possible to offer content such as an image or music for relaxing eyestrain to the user.

The reliability determination unit 49 shown in FIG. 3 will be described. The reliability determination unit 49 determines the reliability of detection result by the biosensor 38 on the basis of a movement amount (correction amount) from the initial state in the display 21 or the left and right lens systems 22. For example, it is determined that the HMD 100 is deviated from the head as movement amounts of the lens system 22 are greater. That is, with the assumption that the detection terminal part of a brain wave sensor, a myoelectric sensor, or the like is not highly likely to be substantially in contact with a prescribed position of the body, the reliability of a detected signal is set to be low. Thus, it is possible to effectively use a detection result by the biosensor 38.

For example, it is possible to detect the swinging or the like of the HMD 100 with the nine-axis sensor 36 but is not possible to determine whether the detection terminal part of the biosensor 38 is substantially in contact with the skin. In the present embodiment, it is possible to determine whether a detection terminal part is substantially in contact with the skin and determine the reliability of a detection result on the basis of a movement amount by the mechanism drive unit 145 with respect to at least a part of the image display mechanism 20.

Note that the reliability of a detection result by the biosensor 38 may be determined on the basis of, for example, biological information obtained from the biosensors of other wearable devices in the form of a watch, a neckless, a ring, or the like or determination results about contacting the skin with biosensors determined by other wearable devices. Of course, the reliability of a detection result by the biosensor 38 may be determined on the basis of biological information or the like acquired by other terminals not classified into wearable devices.

When eye information and other information are used in combination, the used information may be weighted. A weighting method is not limited and may be arbitrarily set.

Other Embodiments

The present technology is not limited to the embodiment described above, and various other embodiments may be realized.

The above description refers to a case in which each of the display 21, the left-eye lens system 22a, and the right-eye lens system 22*b* is movable as an example of moving at least a part of the image display mechanism 20. Besides this, only the display 21 may be movable, or only the left and right lens systems 22 may be movable. Further, other members constituting the image display mechanism 20 may be movable. Further, only a part of the image display mechanism 20 may be movable to change a viewing state.

When the lens system 22 or the like is frequently moved by the mechanism drive unit 45, it may be determined that the fastening degree of the attachment band unit 11 is loose. When it is determined that the fastening degree is loose, the attachment band unit 11 is automatically adjusted on the basis of, for example, eye information. Alternatively, a notification about urging the adjustment of the attachment band unit 11 is made.

By using the present technology, it is also possible to view content in a state in which the fastening degree of the attachment band unit 11 is made loose on purpose. By, for example, performing the processing shown in FIG. 9 at a high speed, it is possible to prevent influence caused by the deviation of the HMD 100 when the fastening degree is loose. Thus, since there is no need to tightly fasten the attachment band unit 11, it is possible to substantially reduce an attachment load on the user. Further, since a mechanism for finely adjusting the attachment band unit 11 is eliminated, the simplification, miniaturization, and lightweight of the apparatus are realized. Further, time and trouble to attach the apparatus is saved.

Further, it is also possible to estimate the aging degradation or the like of the drive mechanism 26 or the like on the basis of a time for adjusting focus, that is, a time until the apparatus is restored to the initial state.

Figure 12:
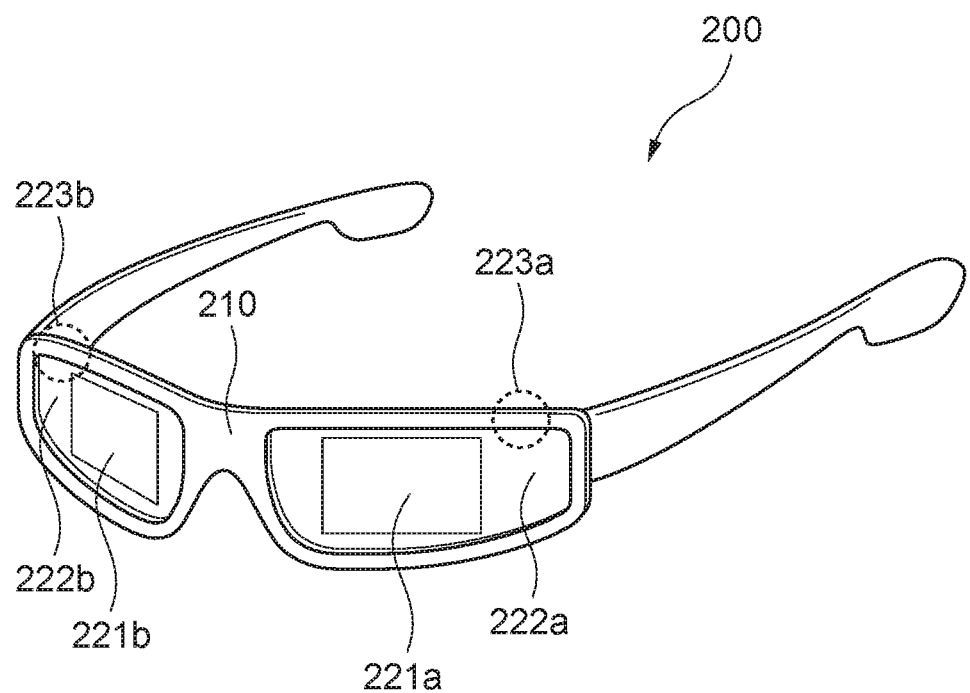
FIG. 12 is a perspective view showing the appearance of an HMD according to another embodiment.

FIG. 12 is a perspective view showing the appearance of an HMD according to another embodiment. The HMD 200 is a glasses-type apparatus including a see-through display and attached to the head of the user to be used. The HMD 200 has a frame 210, a left lens 222*a*, a right lens 222*b*, a left-eye display 221*a*, a right-eye display 221*b*, a left-eye camera 223*a*, and a right-eye camera 223*b*. Further, a controller, a sensor unit, or the like substantially the same as that shown in FIG. 3 is constituted inside or at a prescribed position of the frame 210.

The left lens 222*a* and the right lens 222*b* are arranged in front of the left eye and right eye of the user, respectively. The left-eye display 221*a* and the right-eye display 221*b* are provided in the left lens 222*a* and the right lens 222*b*, respectively, so as to cover the visual field of the user.

The left-eye display 221*a* and the right-eye display 221*b* are see-through displays and have a left-eye image and a right-eye image or the like displayed thereon, respectively. The user wearing the HMD 200 is allowed to visually recognize images displayed on the respective displays while visually recognizing an actual scene. Thus, the user is allowed to experience AR (Augmented Reality) or the like.

Note that dimmer elements (not shown) or the like may be provided on the outside (a side opposite to the eyes of the user) of the left-eye display 221*a* and the right-eye display 221*b*, respectively. The dimmer elements are elements capable of adjusting an amount of light passing through the elements. With the provision of the dimmer elements, it is possible to control, for example, an actual scene passing through the respective displays and visually recognized by the user and cause the user to visually recognize images displayed on the respective displays in an emphasized manner. Thus, the user is allowed to experience VR (Virtual Reality) or the like.

As the left-eye display 221*a* and the right-eye display 221*b*, see-through organic EL displays, LCDs (Liquid Crystal Displays), or the like are, for example, used. Further, as the dimmer elements, dimmer glasses, dimmer sheets, liquid crystal shutters, or the like capable of electrically controlling transmittance are, for example, used. In the present embodiment, an image display mechanism is realized by the left lens 222*a*, the right lens 222*b*, the left-eye display 221*a*, and the right-eye display 221*b*.

The left-eye camera 223*a* and the right-eye camera 223*b* are provided at arbitrary positions at which the left eye and right eye of the user are capable of being shot. On the basis of, for example, images of the left eye and the right eye shot by the left-eye camera 223*a* and the right-eye camera 223*b*, eye information regarding the eyes of the user is acquired.

In the HMD 200 shown in FIG. 12, each of the left lens 222*a* and the right lens 222*b* is configured to be movable with respect to the frame 210 and moved by a drive mechanism. Further, the frame 210 itself is also configured to be movable and capable of changing its retention force. By appropriately changing the position or inclination of each of the left lens 222*a* and the right lens 222*b* on the basis of eye information, it is possible to realize high-quality viewing experience like the above embodiments.

As described above, the present technology is also applicable to a see-through HMD such as AR glasses. For example, by changing the display positions of content images displayed on see-through displays on the basis of eye information during the experience of AR, it is also possible to correct the deviation between the real world and the content images with high accuracy. That is, in the AR, it is possible to change coordinate axes in a virtual world overlapping a real scene with high accuracy.

With attention paid to this point, it may be said that the present technology is effective mainly for correcting the deviation of focus with respect to content in VR and is effective mainly for correcting the deviation of the position of content in AR. Of course, the present technology is not limited such objects.

Fields to which the present technology is applicable are not limited. The present technology is applicable to, for example, arbitrary fields in which information is displayed in the view of the user in operation, such as video games, medical treatment (HMDs for surgeries or the like), motor sports (drivers' helmets or the like), sports including golf or the like, and examinations in factories or the like.

As an embodiment of the information processing apparatus according to the present technology, the above description refers to an HMD that is an image display apparatus. However, the information processing apparatus according to the present technology may be realized by an arbitrary computer that is constituted separately from an HMD and connected to the HMD in a wired or wireless fashion. An information processing method according to the present technology may be performed by, for example, a cloud server. Alternatively, an HMD and other computers may work together to perform the information processing method according to the present technology.

That is, the information processing method and a program according to the present technology are capable of being performed not only by a computer system constituted by a single computer but also by a computer system in which a plurality of computers works together to operate. Note that, a system refers to the aggregate of a plurality of constituents (such as apparatuses and modules (components)) and all the constituents are not necessarily accommodated in the same housing in the present disclosure. Accordingly, both of a plurality of apparatuses that is accommodated in separate housings and connected to each other via a network and one apparatus in which a plurality of modules is accommodated in one housing are systems.

The execution of the information processing method and the program according to the present technology based on a computer system includes both a case in which the control or the like of, for example, the acquisition of eye information or the movement of at least a part of an image display mechanism is executed by a single computer and a case in which respective processing is executed by different computers. Further, the execution of respective processing by a prescribed computer includes causing other computers to execute a part or all of the processing and acquiring results.

That is, the information processing method and the program according to the present technology is also applicable to the configuration of cloud computing in which one function is shared and cooperatively processed by a plurality of apparatuses via a network.

Among the characteristic parts according to the present technology described above, at least two characteristic parts may be combined together. That is, the various characteristic parts described in the respective embodiments may be arbitrarily combined together without being distinguished between the respective embodiments. Further, the various effects described above are given only for an example and should not be interpreted in a limited way. Further, other effects may be produced.

Note that the present technology may employ the following configurations.

(1) An information processing apparatus including:
an acquisition unit that acquires eye information regarding an eye of a user; and
a movement unit that moves, on the basis of the acquired eye information, at least a part of an image display mechanism that emits and guides image light to the eye of the user.

(2) The information processing apparatus according to (1), in which
the image display mechanism has a display that emits the image light and a lens system that guides the image light emitted from the display to the eye of the user, and
the movement unit moves at least one of the display or the lens system.

(3) The information processing apparatus according to (1) or (2), in which
the eye information includes an eye image obtained by shooting the eye of the user.

(4) The information processing apparatus according to (3), in which
the eye information includes at least one of a shape, a size, a position, an inclination, or an iris pattern of the eye of the user in the eye image.

(5) The information processing apparatus according to (3) or (4), in which
the image display mechanism is provided in an HMD (Head Mount Display) wearable by the user, and
the eye information includes the eye image obtained by shooting the eye of the user with an imaging mechanism of the HMD.

(6) The information processing apparatus according to any one of (1) to (5), further including:
a storage unit that stores reference eye information representing the eye information obtained when the eye of the user is put in a prescribed state with respect to the image display mechanism, and
the movement unit moves at least a part of the image display mechanism on the basis of the acquired eye information and the reference eye information.

(7) The information processing apparatus according to (6), in which
the prescribed state includes a state in which a reference image displayed by the image display mechanism is arranged at a prescribed size and a prescribed position with respect to the eye of the user inside the eye image.

(8) The information processing apparatus according to (6) or (7), in which
the eye information includes an eye image obtained by shooting the eye of the user,
the reference eye information includes a reference eye image obtained by shooting the eye of the user when the eye of the user is put in the prescribed state with respect to the image display mechanism, and
the movement unit moves at least a part of the image display mechanism on the basis of a difference between the eye image and the reference eye image.

(9) The information processing apparatus according to (8), in which
the movement unit moves at least a part of the image display mechanism such that a state of the eye of the user with respect to the image display mechanism comes close to the prescribed state.

(10) The information processing apparatus according to (8) or (9), in which
the movement unit moves at least a part of the image display mechanism such that a state of the eye of the user with respect to the image display mechanism is put in another state different from the prescribed state.

(11) The information processing apparatus according to any one of (1) to (10), further including
a display control unit that controls an image display by the image display mechanism, in which
the display control unit moves, on the basis of the acquired eye information, a display position of an image displayed by the image display mechanism.

(12) The information processing apparatus according to any one of (1) to (11), in which
the movement unit moves at least a part of the image display mechanism on the basis of details of content displayed by the image display mechanism.

(13) The information processing apparatus according to any one of (1) to (12), in which
the movement unit moves at least a part of the image display mechanism on the basis of a viewing time of the user.

(14) The information processing apparatus according to any one of (1) to (13), further including
a state acquisition unit that acquires state information regarding a state of the user, in which
the movement unit moves at least a part of the image display mechanism on the basis of the acquired state information.

(15) The information processing apparatus according to any one of (1) to (14), in which
the image display mechanism is provided in an HMD (Head Mount Display) wearable by the user, and
the information processing apparatus further includes a determination unit that determines reliability of a detection result by a biosensor on the basis of a movement amount by the movement unit with respect to at least a part of the image display mechanism.

(16) The information processing apparatus according to any one of (1) to (15), in which the image display mechanism is provided in an HMD (Head Mount Display) wearable by the user, and the information processing apparatus further includes an attachment state control unit capable of controlling an attachment state of the HMD on the basis of the acquired eye information.

(17) The information processing apparatus according to any one of (1) to (16), further including a notification unit that notifies the user of prescribed information on the basis of the acquired eye information.

(18) The information processing apparatus according to any one of (1) to (17), in which the eye information includes a left-eye image obtained by shooting a left eye of the user and a right-eye image obtained by shooting a right eye of the user, and the movement unit moves at least a part of the image display mechanism on the basis of the left-eye image or the right-eye image.

(19) An information processing method performed by a computer system, the information processing method including:

acquiring eye information regarding an eye of a user; and moving, on the basis of the acquired eye information, at least a part of an image display mechanism that emits and guides image light to the eye of the user.

(20) A program causing a computer system to perform:

a step of acquiring eye information regarding an eye of a user; and a step of moving, on the basis of the acquired eye information, at least a part of as image display mechanism that emits and guides image light to the eye of the user.

REFERENCE SIGNS LIST

1(1a, 1b) eye of user
11 attachment band unit
12 display
13 display unit
15 imaging mechanism
17 temporal band
18 parietal band
20 image display mechanism
21 display
22(22a, 22b) lens system
23a, 223a left-eye camera
23b, 223b right-eye camera
25 band adjustment mechanism
26 drive mechanism
30 storage unit
31 sensor unit
32 controller
38 biosensor
55 eye image
56 eye region
57 long axis
60 reference image
100, 200 HMD
221a left-eye display
221b right-eye display
222a left lens
222b right lens

The invention claimed is:

1. An information processing apparatus comprising:

an acquisition unit configured to acquire eye information regarding an eye of a user, the eye information including an eye image obtained by shooting the eye of the user, and a size of the eye of the user in the eye image;

a storage unit configured to store reference eye information representing the eye information obtained when the eye of the user is put in a prescribed state with respect to an image display mechanism that emits and guides image light to the eye of the user; and a movement unit configured to move, on a basis of the acquired eye information and the reference eye information, at least a part of the image display mechanism such that a size of the eye of the user included in the acquired eye information comes closer to the size of the eye of the user in the prescribed state, and wherein the acquisition unit, the storage unit, and the movement unit are each implemented via at least one processor.

2. The information processing apparatus according to claim 1, wherein the image display mechanism has a display that emits the image light and a lens system that guides the image light emitted from the display to the eye of the user, and the movement unit is further configured to move at least one of the display or the lens system.

3. The information processing apparatus according to claim 1, wherein the eye information includes an eye image obtained by shooting the eye of the user.

4. The information processing apparatus according to claim 3, wherein the eye information further includes at least one of a size, a position, an inclination, or an iris pattern of the eye of the user in the eye image.

5. The information processing apparatus according to claim 3, wherein the image display mechanism is provided in a Head Mount Display (HMD) wearable by the user, and the eye information includes the eye image obtained by shooting the eye of the user with an imaging mechanism of the HMD.

6. The information processing apparatus according to claim 1, wherein the prescribed state includes a state in which a reference image displayed by the image display mechanism is arranged at a prescribed size and a prescribed position with respect to the eye of the user inside the eye image.

7. The information processing apparatus according to claim 1, wherein the eye information includes an eye image obtained by shooting the eye of the user, the reference eye information includes a reference eye image obtained by shooting the eye of the user when the eye of the user is put in the prescribed state with respect to the image display mechanism, and the movement unit is further configured to move at least a part of the image display mechanism on a basis of a difference between the eye image and the reference eye image.

8. The information processing apparatus according to claim 7, wherein the movement unit is further configured to move at least a part of the image display mechanism such that a state of the eye of the user with respect to the image display mechanism comes close to the prescribed state.

9. The information processing apparatus according to claim 7, wherein the movement unit is further configured to move at least a part of the image display mechanism such that a state of the eye of the user with respect to the image display mechanism is put in another state different from the prescribed state.

10. The information processing apparatus according to claim 1, further comprising
a display control unit configured to control an image display by the image display mechanism, wherein
the display control unit is further configured to move, on a basis of the acquired eye information, a display position of an image displayed by the image display mechanism, and
the display control unit is implemented via at least one processor.

11. The information processing apparatus according to claim 1, wherein
the movement unit is further configured to move at least a part of the image display mechanism on a basis of details of content displayed by the image display mechanism.

12. The information processing apparatus according to claim 1, wherein
the movement unit is further configured to move at least a part of the image display mechanism on a basis of a viewing time of the user.

13. The information processing apparatus according to claim 1, further comprising
a state acquisition unit configured to acquire state information regarding a state of the user, wherein
the movement unit is further configured to move at least a part of the image display mechanism on a basis of the acquired state information, and
the state acquisition unit is implemented via at least one processor.

14. The information processing apparatus according to claim 1, wherein
the image display mechanism is provided in a Head Mount Display (HMD) wearable by the user,
the information processing apparatus further includes a determination unit configured to determine reliability of a detection result by a biosensor on a basis of a movement amount by the movement unit with respect to at least a part of the image display mechanism, and
wherein the determination unit is implemented via at least one processor.

15. The information processing apparatus according to claim 1, wherein
the image display mechanism is provided in a Head Mount Display (HMD) wearable by the user,
the information processing apparatus further includes an attachment state control unit configured to control an attachment state of the HMD on a basis of the acquired eye information, and
the attachment state control unit is implemented via at least one processor.

16. The information processing apparatus according to claim 1, further comprising
a notification unit configured to notify the user of prescribed information on a basis of the acquired eye information,
wherein the notification unit is implemented via at least one processor.

17. The information processing apparatus according to claim 1, wherein
the eye information includes a left-eye image obtained by shooting a left eye of the user and a right-eye image obtained by shooting a right eye of the user, and
the movement unit is further configured to move at least a part of the image display mechanism on a basis of the left-eye image or the right-eye image.

18. The information processing apparatus according to claim 1, wherein the movement unit is further configured to move at least a part of the image display mechanism on a basis of a difference between the size of the eye of the user included in the acquired eye information and the size of the eye of the user in the prescribed state.

19. An information processing method performed by a computer system, the information processing method comprising:
acquiring eye information regarding an eye of a user, the eye information including an eye image obtained by shooting the eye of the user, and a size of the eye of the user in the eye image;
storing reference eye information representing the eye information obtained when the eye of the user is put in a prescribed state with respect to an image display mechanism that emits and guides image light to the eye of the user; and
moving, on a basis of the acquired eye information and the reference eye information, at least a part of the image display mechanism such that a size of the eye of the user included in the acquired eye information comes closer to the size of the eye of the user in the prescribed state.

20. A non-transitory computer-readable medium having embodied thereon a program, which when executed by a computer causes the computer to execute an information processing method, the method comprising:
acquiring eye information regarding an eye of a user, the eye information including an eye image obtained by shooting the eye of the user, and a size of the eye of the user in the eye image;
storing reference eye information representing the eye information obtained when the eye of the user is put in a prescribed state with respect to an image display mechanism that emits and guides image light to the eye of the user; and
moving, on a basis of the acquired eye information and the reference eye information, at least a part of the image display mechanism such that a size of the eye of the user included in the acquired eye information comes closer to the size of the eye of the user in the prescribed state.

* * * * *